(12) United States Patent
     Hara et al.

(10) Patent No.: US 12,698,827 B2
(45) Date of Patent: Aug. 4, 2026

(54) LUBRICATION STRUCTURE

(71) Applicant: UNIVANCE CORPORATION,
     Kosai-City (JP)

(72) Inventors: Tomoyuki Hara, Kosai-City (JP);
     Takaaki Onoda, Kosai-City (JP);
     Masaki Yoshikane, Kosai-City (JP);
     Masanori Nagata, Kosai-City (JP)

(73) Assignee: UNIVANCE CORPORATION,
     Kosai-City (JP)

( * ) Notice: Subject to any disclaimer, the term of this
     patent is extended or adjusted under 35
     U.S.C. 154(b) by 0 days.

(21) Appl. No.: 19/117,485

(22) PCT Filed: Oct. 3, 2022

(86) PCT No.: PCT/JP2022/036943
     § 371 (c)(1),
     (2) Date: Apr. 1, 2025

(87) PCT Pub. No.: WO2024/075149
     PCT Pub. Date: Apr. 11, 2024

(65) Prior Publication Data
     US 2026/0126111 A1      May 7, 2026

(51) Int. Cl.
     *F16H 57/04*      (2010.01)
     *F16C 3/02*      (2006.01)
(52) U.S. Cl.
     CPC ............. *F16H 57/043* (2013.01); *F16C 3/02*
         (2013.01); *F16D 2300/06* (2013.01)
(58) Field of Classification Search
     CPC .... F16D 13/76; F16D 2300/06; F16H 57/043;
                                                F16C 3/02
     See application file for complete search history.

(56) References Cited

U.S. PATENT DOCUMENTS

| | | | | |
|---|---|---|---|---|
| 4,644,912 A | * | 2/1987 | Umeha | ................... F01M 11/02 |
| | | | | 123/90.6 |
| 11,054,017 B2 | * | 7/2021 | Nomura | .............. F16H 57/0447 |

(Continued)

FOREIGN PATENT DOCUMENTS

| | | |
|---|---|---|
| CN | 114567102 A | 5/2022 |
| DE | 10 2005 052 451 A1 | 5/2007 |

(Continued)

OTHER PUBLICATIONS

Translation of Written Opinion dated Nov. 29, 2022 issued in
counterpart application No. PCT/JP2022/036943 (3 pages).

(Continued)

*Primary Examiner* — Minh Truong
(74) *Attorney, Agent, or Firm* — WHDA, LLP

(57)                ABSTRACT

A lubrication structure includes a shaft having therein the oil
passage, which is bottomed, extending in an axial direction,
and a pipe that is open at both ends and disposed in the oil
passage along the shaft. The shaft includes discharge chan-
nels open at an outer circumference of the shaft and extend-
ing from the oil passage toward an outer side in a radial
direction. The discharge channels are provided to be spaced
from each other in the axial direction. The pipe includes a
partition provided on an outer circumference of the pipe, and
the partition is located between openings of adjacent ones of
the discharge channels and is in contact with an inner surface
of the oil passage.

3 Claims, 3 Drawing Sheets

(56)                References Cited

U.S. PATENT DOCUMENTS

| | | | | |
|---|---|---|---|---|
| 2013/0213740 A1* | 8/2013 | Tanaka | ................. | F16H 57/043 |
| | | | | 184/6.12 |
| 2020/0256452 A1* | 8/2020 | Fukasawa | ........... | F16H 57/0426 |
| 2021/0237567 A1* | 8/2021 | Tsuchihashi | ........ | F16H 57/0424 |

FOREIGN PATENT DOCUMENTS

| | | |
|---|---|---|
| DE | 102013011588 A1 | 1/2015 |
| DE | 10 2020 110 354 A1 | 10/2021 |
| JP | 9-177949 A | 7/1997 |

OTHER PUBLICATIONS

International Search Report dated Nov. 29, 2022, issued in counterpart International Application No. PCT/JP2022/036943, with English Translation. (5 pages).
Written Opinion of the International Searching Authority (Form PCT/ISA/237) dated Nov. 29, 2022, issued in counterpart International Application No. PCT/JP2022/036943. (3 pages).
Office Action dated Aug. 19, 2025, issued in counterpart JP Application No. 2024-555473, with English translation. (7 pages).
Extended (Supplementary) European Search Report dated Jun. 9, 2026, issued in counterpart EP Application No. 22961341.9. (9 pages).

* cited by examiner

FIG. 3（a）
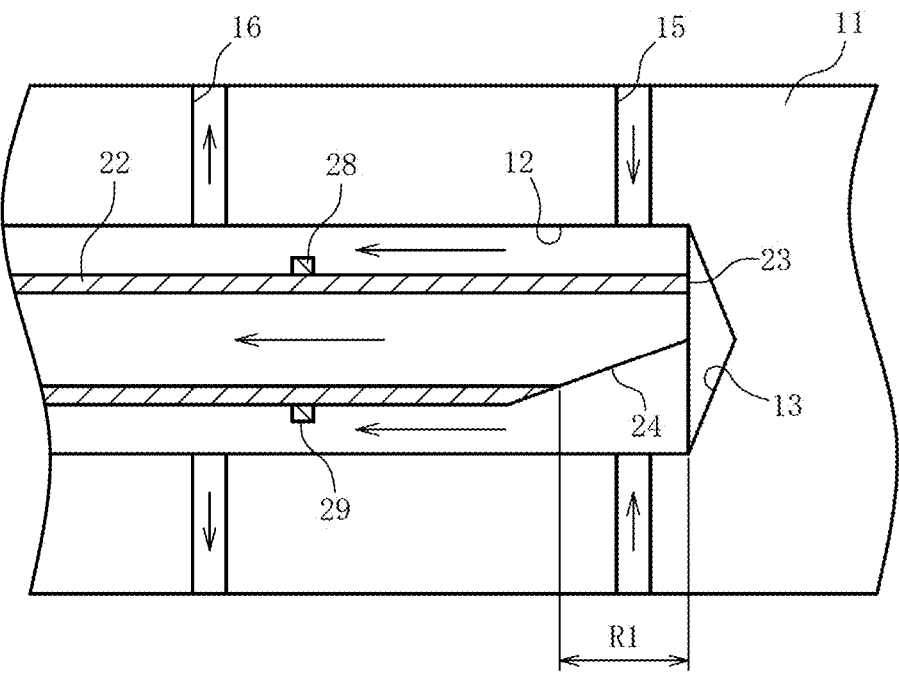
FIG. 3（b）
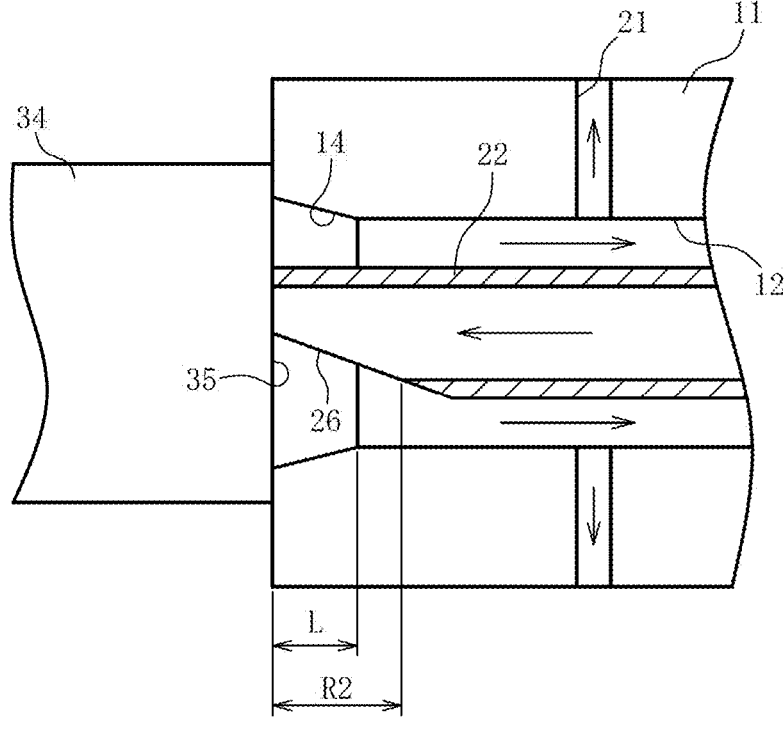

LUBRICATION STRUCTURE

TECHNICAL FIELD

The present invention relates to a lubrication structure in which an oil passage through which lubricating oil flows is provided in a shaft.

BACKGROUND ART

For a lubrication structure in which a bottomed oil passage through which lubricating oil flows, and a plurality of discharge channels for discharging the oil from the oil passage are provided in a shaft, Patent Document 1 discloses a conventional art for disposing a pipe press-fitted in a bush into an oil passage. In the conventional art, the bush is press-fitted between an injection channel for injecting oil into the oil passage and discharge channels, and the pipe is disposed in the oil passage such that oil makes a detour to all the discharge channels. The entire amount of the oil injected in the oil passage through the injection channel flows in the pipe, and the oil makes a detour to all the discharge channels, and then sequentially exits the oil passage through ends of the discharge channels to lubricate devices disposed around the shaft.

PRIOR ART DOCUMENT

Patent Document

Patent Document 1: Japanese Patent Application Laid-Open (kokai) No. H9-177949

SUMMARY OF THE INVENTION

Problem to be Solved by the Invention

In the conventional art, since oil makes a detour to all the discharge channels and then sequentially exits the oil passage through the ends of the discharge channels, the amount of oil that exits the oil passage through the discharge channel that the oil reaches last (in other words, the amount of oil that exits the oil passage through the discharge channel on an injection side) is insufficient in some cases.

The present invention has been made in order to solve this problem, and an object of the present invention is to provide a lubrication structure capable of ensuring the amount of oil that exits an oil passage through a discharge channel.

Means for Solving the Problem

In order to attain this object, a lubrication structure of the present invention includes a shaft that has therein an oil passage having a bottom and extending in an axial direction, and a pipe that is open at both ends and that is disposed in the oil passage along the shaft. The shaft includes a plurality of discharge channels extending from the oil passage toward an outer side in a radial direction and being open at an outer circumference of the shaft, and the plurality of discharge channels are provided so as to be spaced from each other in the axial direction. The pipe includes a partition provided on an outer circumference of the pipe, and the partition is located between openings of adjacent ones of the plurality of discharge channels and is in contact with an inner surface of the oil passage.

Advantageous Effects of the Invention

According to a first aspect, the partition provided on the outer circumference of the pipe is located between the openings of the adjacent ones of the plurality of discharge channels provided so as to be spaced from each other in the axial direction. Through one of the adjacent discharge channels separated by the partition, oil having flowed through the pipe is discharged, and, through the other one of the discharge channels, oil having flowed between the oil passage and the pipe is discharged. Since oil flows inside and outside of the pipe in parallel toward the partition, and sequentially exits the oil passage through the discharge channels in two directions, insufficiency in the amount of oil that exits the oil passage through the discharge channel that the oil reaches last can be prevented. Thus, the amount of oil that exits the oil passage through the discharge channel can be ensured.

According to a second aspect, in the first aspect, a spacer provided on the outer circumference of the pipe so as to be spaced from the partition in the axial direction is in contact with the oil passage and includes a hole through which oil passes. Since the pipe is supported at at least two points, that is, the partition and the spacer, the pipe can be prevented from oscillating with respect to the partition in the oil passage.

According to a third aspect, in the first aspect or the second aspect, the oil passage has bottoms at both ends in the axial direction. An injection channel extends from the oil passage toward the outer side in the radial direction and is open at the outer circumference of the shaft, and the pipe includes a first cut which is an oblique cut portion of the first end. Even if the end of the pipe is in contact with the bottom of the oil passage, oil enters the pipe through the first cut from the injection channel. Thus, the position in the axial direction of the pipe need not be fixed so as to prevent a case where oil is hindered from entering the pipe when the end of the pipe is in contact with the bottom of the oil passage.

According to a fourth aspect, in the third aspect, the pipe includes a second cut which is an oblique cut part of a second end. Even if an end of the pipe is in contact with the bottom of the oil passage, oil exits the pipe through the second cut. Thus, the position in the axial direction of the pipe need not be fixed so as to prevent a case where no oil exits the pipe when the end of the pipe is in contact with the bottom of the oil passage.

BRIEF DESCRIPTION OF THE DRAWINGS

FIG. 3(a) is a cross-sectional view of the lubrication structure including a first end of the pipe, and FIG. 3(b) is a cross-sectional view of the lubrication structure including a second end of the pipe.

MODES FOR CARRYING OUT THE INVENTION

Figure 1:
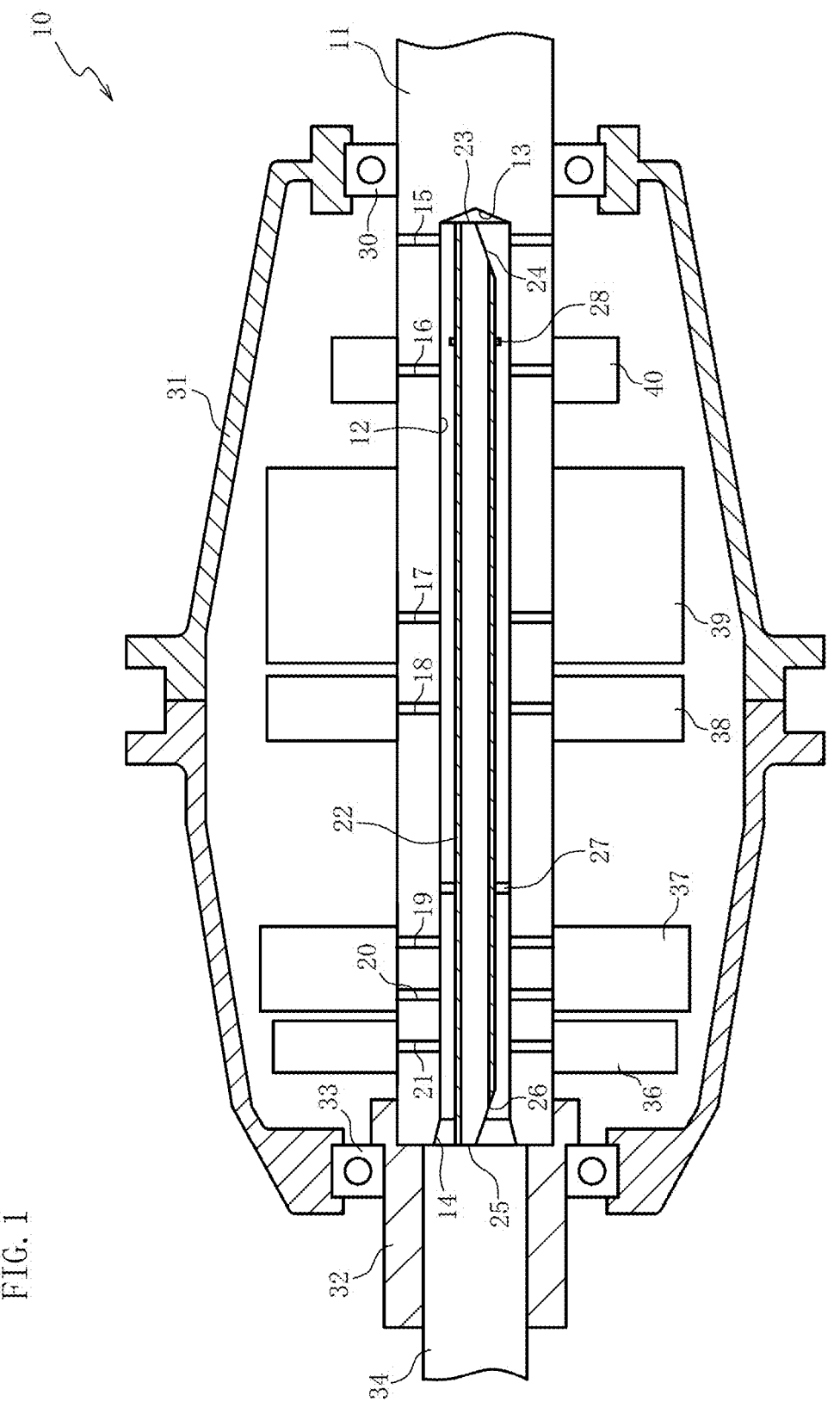
FIG. 1 is a cross-sectional view of a lubrication structure according to an embodiment.

Hereinafter, a preferred embodiment of the present invention will be described with reference to the accompanying drawings. FIG. 1 is a cross-sectional view of a lubrication structure 10 according to the embodiment. The lubrication structure 10 is a structure for supplying lubricating oil to devices (described below) disposed around a shaft 11. An oil passage 12 extending in an axial direction is provided at the center of the shaft 11. The oil passage 12 is a blind hole that is open at one end of the shaft 11 and has a bottom 13 inside the shaft 11. A conical chamfer 14 is applied to the edge of the open end of the oil passage 12.

An injection channel 15 and discharge channels 16, 17, 18, 19, 20, 21 are provided in the shaft 11. The injection channel 15 and the discharge channels 16, 17, 18, 19, 20, 21 extend from the oil passage 12 toward the outer side in a radial direction, and are open at an outer circumference of the shaft 11. In the present embodiment, each of the injection channel 15 and the discharge channels 16, 17, 18, 19, 20, 21 is open at four locations on the outer circumference of the shaft 11 and is open at four locations on the oil passage 12. However, the number of openings is an example, and may be set as appropriate.

The injection channel 15 is a hole for supplying oil pumped by a pump or the like to the oil passage 12. The discharge channels 16, 17, 18, 19, 20, 21 are holes for supplying oil in the oil passage 12 to devices (described below) disposed around the shaft 11. The injection channel 15 and the discharge channels 16, 17, 18, 19, 20, 21 are provided in the shaft 11 so as to be spaced from each other in the axial direction. The injection channel 15 is connected to a portion near the bottom 13 of the oil passage 12. The injection channel 15 is located at the endmost position, among the injection channel 15 and the discharge channels 16, 17, 18, 19, 20, 21. The discharge channels 16, 17, 18, 19, 20, 21 are arranged so as to be further from the injection channel 15 in this order.

Figure 2:
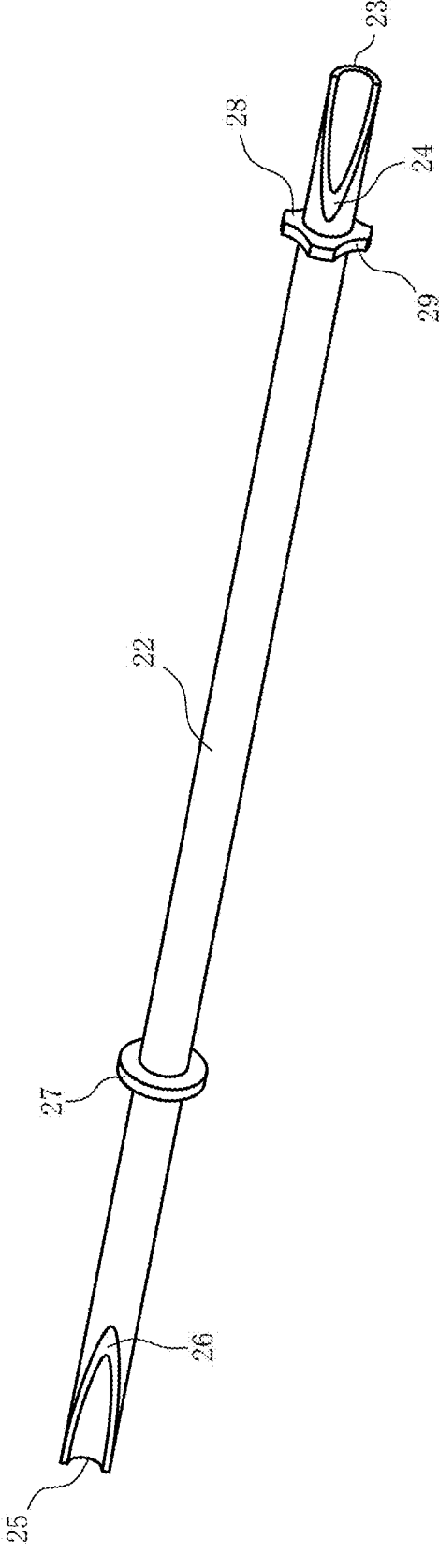
FIG. 2 is a perspective view of a pipe.

FIG. 2 is a perspective view of the pipe 22. The pipe 22 is a cylindrical member that is narrower than the oil passage 12 and that is made of metal or synthetic resin, and is disposed in the oil passage 12. The pipe 22 is open at a first end 23 and a second end 25 in the axial direction. The pipe 22 includes a first cut 24 which is an obliquely cut part of the first end 23 and a second cut 26 which is an obliquely cut part of the second end 25. A flange shaped partition 27 is provided on an outer circumference of the pipe 22. The partition 27 is joined to the pipe 22. The diameter of the partition 27 is slightly smaller than the diameter of the oil passage 12. A clearance fit or a transition fit is suitable for the fitting between the oil passage 12 and the partition 27 when the pipe 22 has been disposed in the oil passage 12. This is because this configuration allows the partition 27 to easily enter the oil passage 12 when the pipe 22 is to be disposed in the oil passage 12.

A flange shaped spacer 28 is provided on the outer circumference of the pipe 22 so as to be spaced from the partition 27 in the axial direction. The spacer 28 is joined to the pipe 22. The spacer 28 is provided between the first end 23 of the pipe 22 and the partition 27. The spacer 28 includes a hole 29 that is a partially recessed portion on an outer circumference of the spacer 28. The diameter of the spacer 28 excluding the hole 29 is slightly smaller than the diameter of the oil passage 12. A clearance fit or a transition fit is suitable for the fitting between the oil passage 12 and the spacer 28 when the pipe 22 has been disposed in the oil passage 12. This is because this configuration allows the spacer 28 to easily enter the oil passage 12 when the pipe 22 is to be disposed in the oil passage 12.

Description will be given returning to FIG. 1. The pipe 22 is disposed in the oil passage 12 such that the first end 23 is located very close to the bottom 13 of the oil passage 12. The length of the pipe 22 is set to be slightly shorter than the length of the oil passage 12. The spacer 28 is disposed between the injection channel 15 and the discharge channel 16. The partition 27 is disposed between the discharge channel 18 and the discharge channel 19 when the pipe 22 has been disposed in the oil passage 12. The partition 27 and the spacer 28 are in contact with the oil passage 12. The pipe 22 is fixed to the oil passage 12 by friction between the partition 27 and the oil passage 12 and friction between the spacer 28 and the oil passage 12. The pipe 22 is supported at two points, that is, the partition 27 and the spacer 28, by the oil passage 12, so that the pipe 22 can be prevented from oscillating in the oil passage 12.

A bearing 30 is disposed, on the outer circumference of the shaft 11, near the bottom 13 of the oil passage 12. The bearing 30 rotatably supports the shaft 11 relative to a case 31. A bearing 33 is disposed between the case 31 and a sleeve 32 disposed coaxially with the shaft 11. The bearing 33 rotatably supports the sleeve 32 relative to the case 31. A shaft 34 arranged coaxially with the shaft 11 is coupled to the sleeve 32. The oil passage 12 of the shaft 11 is closed by the shaft 34, whereby the oil passage 12 has another bottom 35 (see FIG. 3(*b*)).

A plurality of devices 36, 37, 38, 39, 40 housed in the case 31 are disposed on the outer circumference of the shaft 11 so as to be arranged in the axial direction. In FIG. 1, a bearing, a spline, and the like interposed between the shaft 11 and the devices 36, 37, 38, 39, 40 is not shown. As long as friction surfaces of the devices 36, 37, 38, 39, 40 as well as bearings, splines, or the like thereof require lubrication, the devices 36, 37, 38, 39, 40 are not limited. Examples of each of the devices 36, 37, 38, 39, 40 include a gear, a sprocket, a clutch, a brake, and a cam. Oil having entered the oil passage 12 exits through the discharge channels 16, 17, 18, 19, 20, 21 due to centrifugal force generated by the rotation of the shaft 11, and lubricates the friction surfaces of the devices 36, 37, 38, 39, 40.

FIG. 3(*a*) is a cross-sectional view including the first end 23 of the pipe 22 of the lubrication structure 10. The length in the axial direction of the first cut 24 is larger than the diameter of the injection channel 15. An end, of the first cut 24, on a side opposite to the end 23 in the axial direction is located between the bottom 13 of the oil passage 12 and the discharge channel 16. In the present embodiment, a gap is present between the first end 23 of the pipe 22 and the bottom 13 of the oil passage 12. An opening of the injection channel 15 is located in a range R1, on the oil passage 12, determined by projecting the first cut 24 outward in the radial direction.

FIG. 3(*b*) is a cross-sectional view including the second end 25 of the pipe 22 of the lubrication structure 10. A length R2 in the axial direction of the second cut 26 is larger than a length L in the axial direction of the chamfer 14. An end, of the second cut 26, on a side opposite to the end 25 in the axial direction is located between the bottom 35 of the oil passage 12 and the discharge channel 21. In the present embodiment, the second end 25 of the pipe 22 and the shaft 34 are in contact with each other.

A part of oil having entered the oil passage 12 through the injection channel 15 by operation of a pump or the like, enters between the oil passage 12 and the pipe 22, passes through the hole 29 of the spacer 28, flows toward the bottom 35 of the oil passage 12, and sequentially enters the discharge channels 16, 17, 18 to lubricate the respective devices 40, 39, 38. Since the partition 27 is located between the discharge channel 18 and the discharge channel 19, the oil flowing between the oil passage 12 and the pipe 22 is blocked by the partition 27 and cannot reach the discharge channels 19, 20, 21.

The rest of the oil having entered the oil passage 12 through the injection channel 15, enters the pipe 22 through the first cut 24, flows toward the second end 25 of the pipe 22 (see FIG. 1), and exits the pipe 22 through the second cut 26. The oil having exited the pipe 22 hits the bottom 35 of the oil passage 12, enters between the oil passage 12 and the pipe 22, flows toward the bottom 13 of the oil passage 12, and sequentially enters the discharge channels 21, 20, 19 to lubricate the respective devices 36, 37. Since the partition 27 is located between the discharge channel 18 and the discharge channel 19, the oil flowing between the oil passage 12 and the pipe 22 is blocked by the partition 27 and cannot reach the discharge channels 18, 17, 16.

As described above, the oil having entered the oil passage 12 through the injection channel 15 flows inside and outside the pipe 22 in parallel toward the partition 27, sequentially passes, both in a direction toward the bottom 35 of the oil passage 12 and a direction toward the bottom 13 of the oil passage 12, the discharge channels 16, 17, 18 and the discharge channels 21, 20, 19, and exits the oil passage 12 to lubricate the devices 36, 37, 38, 39, 40. Thus, oil can be supplied toward the partition 27 in the both directions, which can prevent insufficiency in the amount of oil that exits the oil passage 12 through the discharge channels 16, 21 located at both ends of the oil passage 12. Accordingly, the amount of oil that exits the oil passage 12 through the discharge channels 16, 17, 18, 19, 20, 21 can be ensured.

Since the partition 27 is disposed between the discharge channel 18 and the discharge channel 19, which are positioned in the middle of the discharge channels 16, 17, 18, 19, 20, 21 arranged in order from the bottom 13 to the bottom 35 of the oil passage 12, the oil that exits the oil passage 12 through the discharge channels 16, 17, 18 and the oil that exits the oil passage 12 through the discharge channels 19, 20, 21 can be ensured in sufficient amounts.

The pipe 22 includes the first cut 24 obliquely provided. Thus, even if the end 23 of the pipe 22 is in contact with the bottom 13 of the oil passage 12, oil enters the pipe 22 through the first cut 24 from the injection channel 15. Since the end 23 of the pipe 22 may come into contact with the bottom 13 of the oil passage 12, the position in the axial direction of the pipe 22 need not be fixed by, for example, making the relation between the partition 27 and the oil passage 12 an interference fit.

The opening of the injection channel 15 is located in the range R1, on the oil passage 12, determined by projecting the first cut 24 outward in the radial direction, and thus oil having entered the oil passage 12 through the injection channel 15 quickly and easily enters the pipe 22. Thus, the amount of oil that exits the oil passage 12 through the discharge channels 19, 20, 21 can be prevented from decreasing.

The pipe 22 includes the second cut 26 obliquely provided. Thus, even if the end 25 of the pipe 22 is in contact with the shaft 34, oil exits the pipe 22 through the second cut 26. Since the end 25 of the pipe 22 may come into contact with the shaft 34, the position in the axial direction of the pipe 22 need not be fixed so as to ensure a gap between the end 25 of the pipe 22 and the shaft 34.

Since the length R2 in the axial direction of the second cut 26 is larger than the length L in the axial direction of the chamfer 14, the size of the area of the cut 26 can be ensured, and the amount of oil that exits the pipe 22 through the second cut 26 can be ensured. Thus, the amount of oil that exits the oil passage 12 through discharge channels 19, 20, 21 can be prevented from decreasing.

While the present invention has been described above based on the embodiment, the present invention is not limited to the above embodiment at all. It can be easily understood that various modifications can be devised without departing from the gist of the present invention. The position, the size, the number, etc. of the injection channel 15 and the discharge channels 16, 17, 18, 19, 20, 21 provided on the shaft 11 may be set as appropriate.

Although a case where oil is supplied to the oil passage 12 through the injection channel 15 has been described in the embodiment, the present invention is not necessarily limited thereto. The injection channel 15 may be omitted. If the injection channel 15 is omitted, oil is supplied to the oil passage 12 from an end, of the oil passage 12, open at an end surface of the shaft 11.

Although a case where the partition 27 is disposed between the discharge channel 18 and the discharge channel 19, which are positioned in the middle of the discharge channels 16, 17, 18, 19, 20, 21 arranged in order from the first end 23 toward the second end 25, has been described in the embodiment, the present invention is not necessarily limited thereto. In order to prevent insufficiency in the amount of oil necessary for lubrication of the devices 36, 37, 38, 39, 40 disposed on the outer circumference of the shaft 11, the position of the partition 27 is set as appropriate.

The size (hole diameter) of each of the discharge channels 16, 17, 18, 19, 20, 21 is not referred to in the embodiment. However, as a matter of course, the size of each discharge channel can be set according to the degree of lubrication required by the device, and more oil can be supplied to the device that needs more.

Although a case where the pipe 22 has a cylindrical shape has been described in the embodiment, the present invention is not necessarily limited thereto. As the shape of a cross section of the pipe 22, a polygonal shape such as a quadrangular shape and a hexagonal shape, a circular shape, or the like is selected as appropriate. As a matter of course, a spiral member or a spiral groove for conveying oil can be provided on the inner side or the outer side of the pipe 22.

Although a case where the hole 29 that is a partially recessed portion on the outer circumference of the spacer 28 is provided in the spacer 28 has been described in the embodiment, the present invention is not necessarily limited thereto. As a matter of course, a hole 29 penetrating the spacer 28 in the axial direction can be provided in the spacer 28. The number and the size of the holes 29 are set as appropriate.

The material of the partition 27 and the spacer 28 provided on the pipe 22 may be the same as the material of the pipe 22 or different from the material of the pipe 22. In a case where the partition 27 or the spacer 28 has been formed of an elastic body such as a rubber or an elastomer, the partition 27 or the spacer 28 can be press-fitted into the oil passage 12, as a matter of course. Also, in the case where the partition 27 or the spacer 28 has been formed of an elastic body, the fitting between the oil passage 12 and the partition 27 and the fitting between the oil passage 12 and the spacer 28 when the pipe 22 has been disposed in the oil passage 12 can be made to be a clearance fit or a transition fit, as a matter of course.

Although a case where the spacer 28 is provided at one location on the pipe 22 has been described in the embodiment, the present invention is not necessarily limited thereto. The spacer 28 does not hinder the movement of oil in the oil passage 12, and thus the spacers 28 can be provided at two or more locations on the pipe 22, as a matter of course.

DESCRIPTION OF REFERENCE NUMERALS 10 lubrication structure
11 shaft
12 oil passage
15 injection channel 16, 17, 18, 19, 20, 21 discharge channel
22 pipe
23 first end
24 first cut
25 second end
26 second cut
27 partition
28 spacer
29 hole

The invention claimed is:

1. A lubrication structure comprising:

a shaft that has therein an oil passage having a bottom and extending in an axial direction; and a pipe that is open at both ends and that is disposed in the oil passage along the shaft, wherein the shaft includes a plurality of discharge channels extending from the oil passage toward an outer side in a radial direction, and being open at an outer circumference of the shaft, the plurality of discharge channels are provided so as to be spaced from each other in the axial direction, the pipe includes a partition provided on an outer circumference of the pipe, and the partition is located between openings of adjacent ones of the plurality of discharge channels, and is in contact with the oil passage, wherein the oil passage has bottoms at both ends in the axial direction, the shaft includes an injection channel extending from the oil passage toward the outer side in the radial direction and being open at the outer circumference of the shaft, and the pipe includes a first cut which is an obliquely cut part of a first end.

2. The lubrication structure according to claim 1, wherein the pipe includes a spacer provided on the outer circumference of the pipe so as to be spaced from the partition in the axial direction, and the spacer is in contact with the oil passage, and includes a hole through which oil passes.

3. The lubrication structure according to claim 1, wherein the pipe includes a second cut which is an obliquely cut part of a second end.

* * * * *